Oct. 12, 1926.  
W. R. REESE  
1,603,149  
METHOD OF PRODUCING PISTON RINGS  
Filed Sept. 12, 1924   2 Sheets-Sheet 2
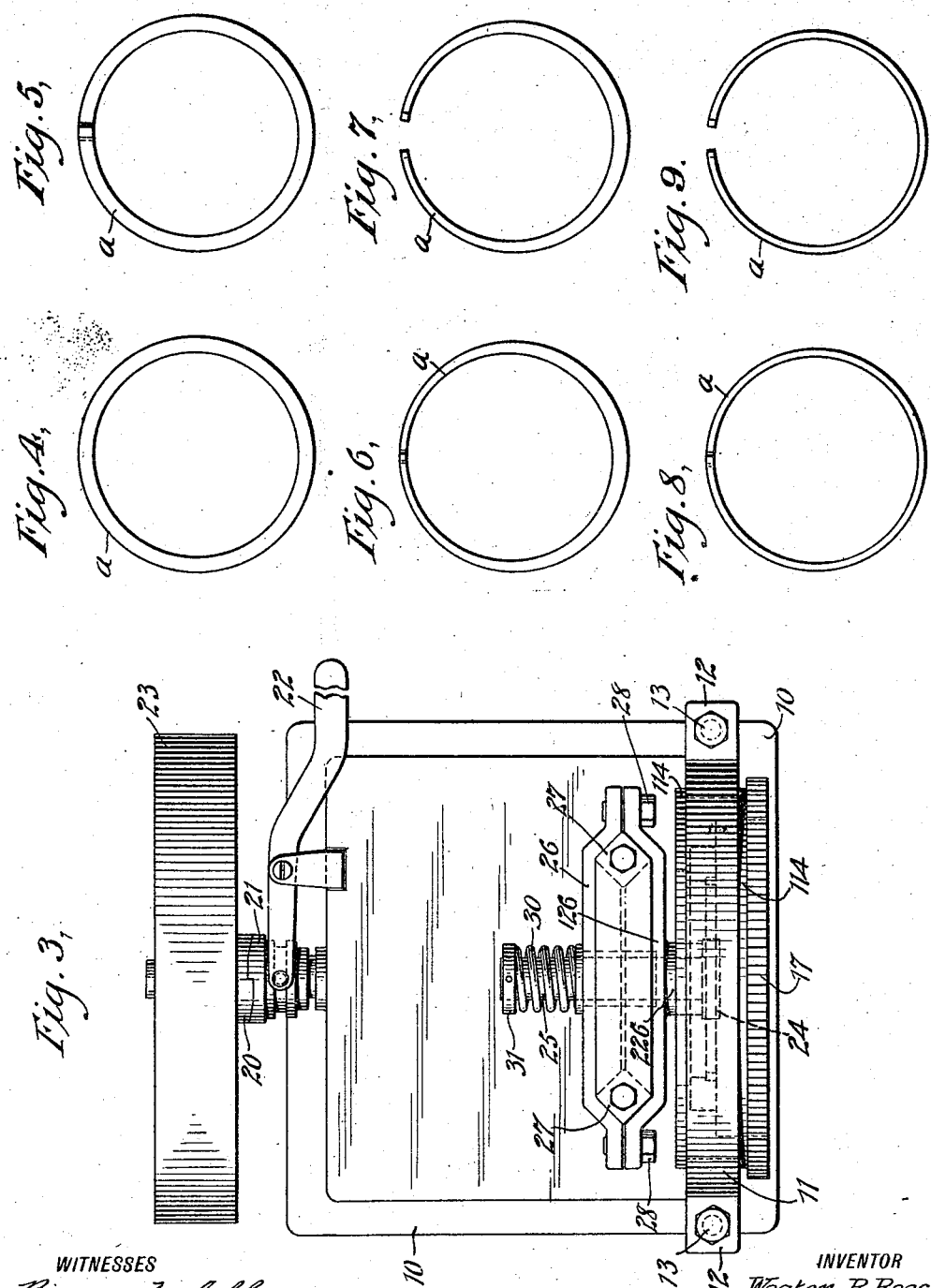
WITNESSES  
INVENTOR  
Weston R. Reese.  
BY  
ATTORNEYS Patented Oct. 12, 1926.

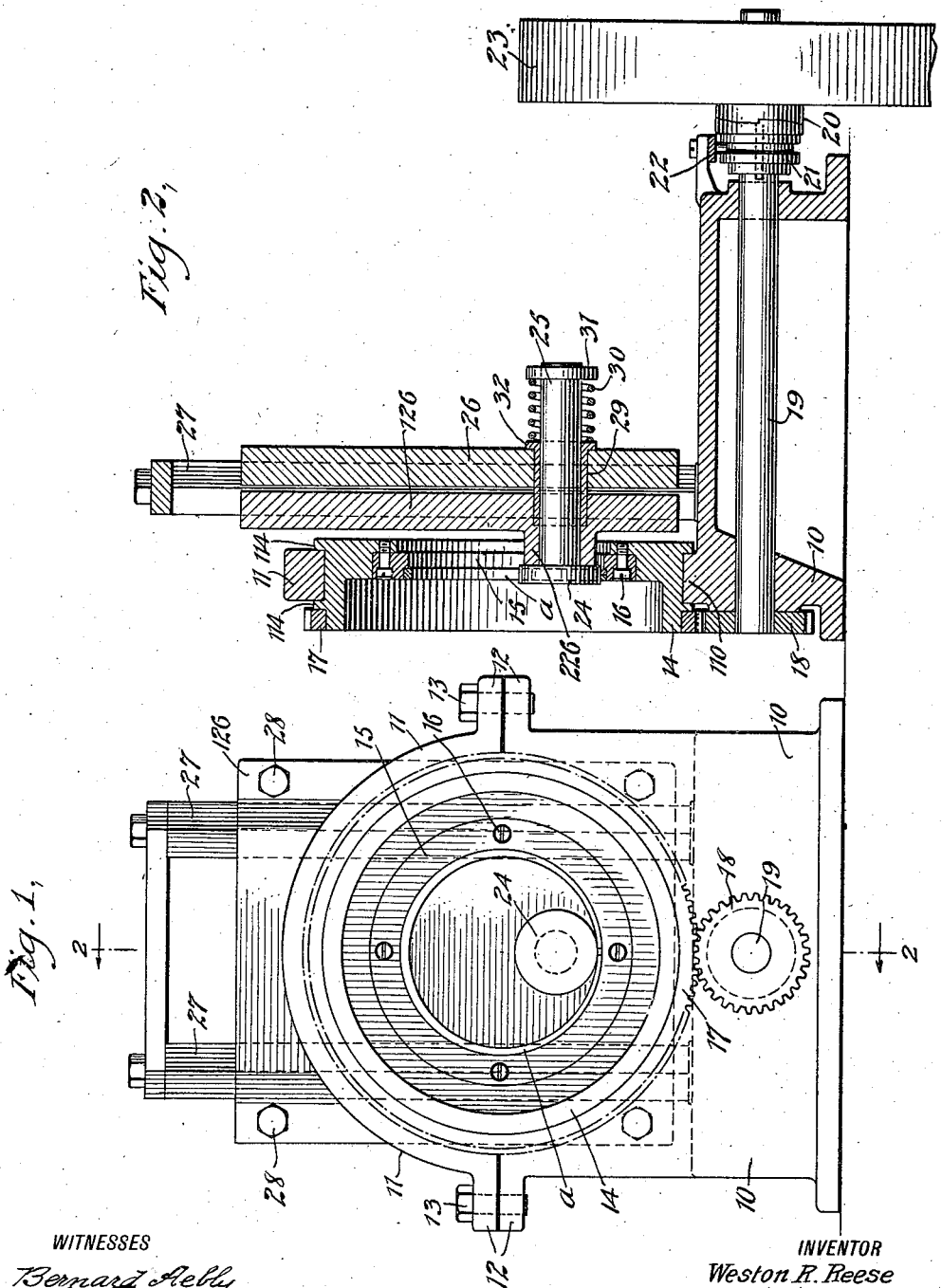

1,603,149

UNITED STATES PATENT OFFICE.

WESTON ROGER REESE, OF SCRANTON, PENNSYLVANIA.

METHOD OF PRODUCING PISTON RINGS.

Application filed September 12, 1924. Serial No. 737,345.

My invention relates to a method and means for subjecting the inner wall or inner circumference of a piston ring to pressure in varying degrees according to the eccentricity of the ring.

The general object of the invention is to provide for effecting the equal tensioning of the ring so that when placed in a cylinder bore the ring will expand with equal pressure against the cylinder wall at all points of the circumference.

Specifically, the invention has for its purpose to effect the tensioning of the ring by the rolling pressure of a roller die whereby to avoid subjecting the ring to blows that would tend to cause fracture of the ring either in the manufacture of the ring or subsequently to the emplacing of the ring on the piston or while ring is in use.

The nature of my invention and its distinguishing features and advantages will clearly appear as the description proceeds.

Reference is to be had to the accompanying drawings forming a part of this specification, it being understood that the drawings are merely illustrative of one example of the invention.

Fig. 1 is a front elevation of the machine for carrying out my invention;

Fig. 2 is a transverse vertical section in the plane indicated by the line 2—2, Fig. 1;

Fig. 3 is a plan view of the machine; and

Figs. 4, 5, 6, 7, 8, and 9 represent the ring in different steps of manufacture.

In carrying out my invention in practice with the aid of the machine illustrated, said machine is formed as follows: A base 10 is provided on which is a strap 11, said base at the front thereof and said strap at its ends having ears 12 to receive bolts or screws 13. The base and strap as thus arranged provide for holding a chuck 14 in which the piston ring $a$ is held. The base 10 is formed with an annular broad rib 110 and the chuck 14 is formed with spaced annular beads 114, said beads accommodating between them the rib 110 and the strap 11 to retain the chuck against displacement.

For holding the ring $a$ in the chuck 14, said chuck is provided with an auxiliary chuck 15 therein, said main and said auxiliary chucks being in ring form and the auxiliary chuck being suitably fastened in the main chuck as by screws 16.

The ring $a$ is placed into the auxiliary chuck 15 in split form.

The holding action of the base 10 and strap 11 on the chuck 14 permits said chuck to be turned so as to turn the ring $a$. In the machine illustrated for carrying out my invention the main chuck 14 is provided with an annular gear 17 which in practice may be shrunk in position or otherwise made rigid with said chuck. Meshing with the ring gear 17 is a pinion 18 and a shaft 19, said shaft having bearings in the base 10 and equipped with a suitable clutch 20 including a shiftable clutch element 21 controlled by a clutch lever 22. Loose on the shaft 19 is shown a drive pulley 23 rigid with which is one of the elements of the clutch 20. When the pulley 23 is driven and the elements of the clutch are in engagement, the shaft 19 will be turned and with it the pinion 18 for turning the chuck 14.

A roller die 24 is provided within the auxiliary chuck 15 and in the plane of the seat provided in said auxiliary chuck for the ring so that said die will be effective in subjecting said ring to rolling pressure. The roller die 24 is on a transverse shaft 25 supported in a block formed of sections 26 and 126 which are vertically disposed and are adapted to be adjusted vertically on guides 27. Thus, the block sections 26 and 126 may be raised to dispose the roller die 24 in a position to accord with the diameter of the given piston ring $a$. Transverse bolts or screws 28 bind the block sections 26 and 126 on the guides 27. A bronze bushing 29 is fitted in the block sections 26, 126 and affords a bearing in which the shaft 25 may turn in response to the turning of the roller by its frictional engagement with the internal wall of the piston ring $a$ as the latter revolves with chucks 14, 15. A coil spring 30 on the shaft 25 abuts at one end against a head 31 on the shaft 25 at the rear end of the latter, and abuts against an annular flange 32 on the bushing 29.

In Figs. 4 to 9 I have illustrated the form of the ring $a$ in the different steps of manufacture. Fig. 4 shows the ring blank in the rough and in the form of a flat ring of unbroken continuity with the inner and outer peripheries concentric to each other. Fig. 5 shows the same blank as in Fig. 4 except that the ring has been machined inside and out and given the form of the split ring by the usual method. After the blank has been split as in Fig. 5 it is machined so that the inner periphery is eccentric with the outer periphery, as is shown in Fig. 6. The ring in the form shown in Fig. 6 is then placed into the chuck 15 of the machine. Roller die 24 is now adjusted by shifting the block sections 26 and 126 vertically on the guides 27 until said roller die has close contact with the inner eccentric wall of the ring $a$ and the guides 26 and 126 are locked in this position. The result is that with the rotation of the chuck 14 and ring $a$, said ring will be subjected to a rolling pressure by the roller die 24, said die expanding the ring by varying degrees according to the eccentric shape of the ring, and the pressure will reach its maximum in the region of the ring diametrically opposite the split of the ring for the ring shown in Fig. 6. Thus the piston ring will be properly tensioned. After the ring has been thus subjected internally to the pressure of the roller die 24, the outer periphery of said ring is turned down externally in a lathe to bring it concentric with the inner periphery, the operation being done while the ring is held compressed as shown in Figure 8.

The ring when turned and released will then take the form shown in Figure 9.

Reverting to the roller die 24 and shaft 25, it will be evident that the spring 30 by its pressure against the head 31 of said shaft holds the roller die 24 against the hub 226 of the block section 126 to maintain the roller die in the plane of the ring $a$.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a method of producing a piston ring, the steps of machining a split ring so that the inner and outer peripheries have an eccentric relation, subjecting the ring internally to roller pressure to tension the ring, then turning down the outer periphery concentric with the inner periphery.

2. In a method of producing a piston ring, machining the ring so that the inner and outer peripheries are in eccentric relation, subjecting the ring to rolling pressure to tension the ring and turning down the ring externally concentric with the inner periphery.

3. In a method of making a piston ring, producing a ring of unbroken continuity, splitting said ring, machining said split ring so that the inner and outer peripheries have an eccentric relation, subjecting the ring at the eccentric inner periphery to rolling pressure to tension the ring, and turning down the ring externally concentric with the inner periphery.

4. In a piston ring, a method of producing tensioning in said ring by graduated rolling pressure, the graduations of pressure being controlled by the eccentric shape of the ring.

5. In a piston ring, a method of producing tensioning in said ring by graduated internal rolling pressure upon the interior periphery thereof, the graduations of pressure being controlled by the eccentric shape of the ring.

WESTON ROGER REESE.